United States Patent
Torii et al.

(10) Patent No.: US 8,356,942 B2
(45) Date of Patent: Jan. 22, 2013

(54) SEALING DEVICE FOR BEARING ASSEMBLY AND WHEEL SUPPORT BEARING ASSEMBLY THEREWITH

(75) Inventors: Akira Torii, Shizuoka (JP); Kazuo Komori, Shizuoka (JP)

(73) Assignee: NTN Corporation, Osaka (JP)

( * ) Notice: Subject to any disclaimer, the term of this patent is extended or adjusted under 35 U.S.C. 154(b) by 335 days.

(21) Appl. No.: 12/734,556

(22) PCT Filed: Nov. 4, 2008

(86) PCT No.: PCT/JP2008/003158
§ 371 (c)(1),
(2), (4) Date: May 7, 2010

(87) PCT Pub. No.: WO2009/060584
PCT Pub. Date: May 14, 2009

(65) Prior Publication Data
US 2010/0232734 A1    Sep. 16, 2010

(30) Foreign Application Priority Data

Nov. 9, 2007   (JP) .................................. 2007-291454
Nov. 27, 2007  (JP) .................................. 2007-305299

(51) Int. Cl.
*F16C 33/76* (2006.01)
(52) U.S. Cl. ..................................................... 384/486
(58) Field of Classification Search .......... 384/484–486, 384/544, 589
See application file for complete search history.

(56) References Cited

U.S. PATENT DOCUMENTS

| | | | |
|---|---|---|---|
| 5,201,529 A | 4/1993 | Heinzen | |
| 6,082,905 A * | 7/2000 | Vignotto et al. | 384/484 |
| 2007/0081751 A1 * | 4/2007 | Norimatsu et al. | 384/486 |
| 2009/0206553 A1 | 8/2009 | Kanzaki | |

FOREIGN PATENT DOCUMENTS

| | | |
|---|---|---|
| JP | 62-69625 | 5/1987 |
| JP | 4-93571 | 8/1992 |
| JP | 7-1334 | 1/1995 |
| JP | 2601238 | 9/1999 |
| JP | 2001-165179 | 6/2001 |
| JP | 2004-239353 | 8/2004 |
| JP | 2006-9965 | 1/2006 |
| JP | 2006118625 A * | 5/2006 |
| JP | 2007-9938 | 1/2007 |

OTHER PUBLICATIONS

Chinese Office Action issued Oct. 18, 2011 in corresponding Chinese Patent Application No. 200880115145.9.

(Continued)

*Primary Examiner* — Thomas R Hannon

(57) ABSTRACT

A bearing sealing device is provided between inner and outer members of a wheel support bearing assembly and includes an annular sealing plate of an L shaped section and an elastic sealing member having an elastic body secured to a core metal of a reverse L-shaped section. The sealing plate includes a cylindrical wall, mounted on an outer periphery of the inner member, and a radial wall extending upwardly from one end thereof. The core metal includes a cylindrical wall, mounted on an inner periphery of the outer member, and a radial upright wall extending radially inwardly from one end thereof. The elastic body includes two side sealing lips, arranged radially of the core metal and having their tips held in contact with the radial upright wall. The distance between those side sealing lips is chosen to be equal to or greater than 0.1 mm.

14 Claims, 12 Drawing Sheets

OTHER PUBLICATIONS

Notification of Submission of Information by Third Party, mailed on Sep. 1, 2009, in corresponding Japanese application No. 2007-291454.
International Search Report for PCT/JP2008/003158, mailed on Jan. 27, 2009.
English Translation of the International Preliminary Report on Patentability mailed Jul. 8, 2010 in corresponding International Patent Application PCT/JP2008/003158.
Second Chinese Office Action mailed May 25, 2012 issued in corresponding Chinese Patent Application No. 200880115145.9.

* cited by examiner

PRIOR ART

PRIOR ART

SEALING DEVICE FOR BEARING ASSEMBLY AND WHEEL SUPPORT BEARING ASSEMBLY THEREWITH

CROSS REFERENCE TO THE RELATED APPLICATIONS

This application claims the benefit under 35 U.S.C. Section 371 of PCT International Application No. PCT/JP2008/003158, filed Nov. 4, 2008, which claimed priority to Japanese patent application No. 2007-291454, filed Nov. 9, 2007, and No. 2007-305299, filed Nov. 27, 2007, the entire disclosures of which are herein incorporated by reference as a part of this application.

FIELD OF THE INVENTION

The present invention relates to a sealing device for use in a bearing assembly in sealing an annular space, delimited between inner and outer rings of a bearing assembly, from the external atmosphere and a wheel support bearing assembly for use in automotive vehicles, which utilizes such sealing device.

BACKGROUND ART

Some of the automotive vehicles such as, for example, trucks travel a substantial total distance of more than a billion kilometer within the life cycle of such vehicles as compared with passenger cars. In the case of those automotive vehicles, the wheel support bearing assemblies employed therein are desired not only to have a correspondingly increased service life but also to employ bearing sealing devices of an increased life time, which are provided at opposite ends of an annular bearing space found in each of the wheel support bearing assemblies.

In view of the above, a bearing sealing device such as shown in FIG. 15, for example, designed to have an increased resistance to muddy water, has been suggested, which includes an L-sectioned sealing plate 62, fitted to a bearing inner ring and having a cylinder wall 62a and a radial upright wall 62b protruding radially outwardly from the cylinder wall 62a, and a core metal equipped elastic sealing member 63 fitted to a bearing outer ring and having two side sealing lips 63a and 63b slidingly engaged with the radial upright wall 62b of the sealing plate 62 and positioned one inside the other with respect to a radial direction thereof. (See, for example, the Patent Document 1 listed below.)

Another bearing sealing device 90, similarly designed to have an increased resistance to muddy water, has also been suggested as shown in FIG. 16, which makes use of rolling elements or balls 64 of a small diameter and in which opposite ends of a bearing space delimited between a bearing outer ring 71 and a bearing inner ring 72 are sealed by respective bearing sealing devices 61 each having side sealing lips 63a and 63b similar to those shown and described with reference to FIG. 15. (See, for example, the Patent Document 2 listed below.)

[Patent Document 1] JP Laid-open Patent Publication No. 2007-9938
[Patent Document 2] JP Laid-open Patent Publication No. 2001-165179

However, if the two side sealing lips 63a and 63b are provided in the bearing sealing device as hereinabove discussed, the resistance to muddy water may increase to a value about twice that exhibited by the conventional standard bearing sealing device, but considering the distance of travel of the trucks, a further increase of the resistance to muddy water is desired.

In addition, with the bearing sealing device of the structure utilizing the two side sealing lips 63a and 63b as discussed above, the widthwise dimension may fall within the range of 4.5 to 5.0 mm, but the sectional height of 8.5 to 10 mm is required and a problem has therefore been found that as compared with the bearing sealing device of the standard structure utilizing only one side sealing lip, the sectional height is large. Considering that in the field of automotive vehicles, low fuel consumption is increasingly desired in recent years, a bearing sealing device is desired of a structure that enables reduction in weight along with compactization not only in an axial direction, but also in a radial direction of a wheel support bearing assembly, where such bearing sealing device is to be incorporated in the wheel support bearing assembly for automotive vehicles. In order to meet such requirements, the bearing sealing device is desired, which is of a kind capable of increasing the resistance to muddy water and having a low sectional height.

In the conventional bearing sealing device utilizing the two side sealing lips, little care has been paid to the relation of the distance between the side sealing lips with the resistance to muddy water and the distance between the two side sealing lips has been equal to or smaller than 0.1 mm while the sectional height has been chosen 8 mm or higher. For this reason, with those dimensional conditions found in the conventional bearing sealing device now under discussion, little effort has been found leading to an improvement of the resistance to muddy water despite of the structure utilizing the two side sealing lips.

As discussed above, if the sectional height of the bearing sealing device can be reduced, it appears to be advantageous in terms of reduction in weight and size of the wheel support bearing assembly that utilized such bearing sealing device. However, as shown in, for example, FIG. 17, when the bearing sealing device is to be installed on an inboard side of a wheel support bearing assembly 100, which is a dual row outwardly oriented angular contact ball bearing of a third generation type, reduction of the sectional height of the bearing sealing device 81 may lead to a weight increase due to formation of a volume or weight increasing portion 91a in one (for example, an outer member 91) of bearing component parts depending on the specification of the bearing assembly. In other words, the outer diameter D of a portion of the outer member 91, positioned on the outer perimeter of the bearing sealing device 81, is a portion, that is to be mounted on a counterpart member such as, for example, a knuckle, and depends on such counterpart member. For that reason, if the sectional height of the bearing sealing device 81 is reduced, the inner diameter of that portion of the outer member 91, where the bearing sealing device 81 is mounted, becomes small, accompanied by increase of the wall thickness enough to form the weight increasing portion 91a. For this reason, where the bearing sealing device is to be reduced in section, care must be taken to avoid anything that hampers reduction in weight and compactization of the wheel support bearing assembly.

SUMMARY OF THE INVENTION

An object of the present invention is to provide a bearing sealing device of a kind having an increased resistance to muddy water and also having the sectional height that can be reduced to allow a bearing assembly having the sealing device to be lightweight, and, also, to a wheel support bearing assembly utilizing such bearing sealing device.

The bearing sealing device designed in accordance with the present invention is a bearing sealing device for sealing between outer and inner members of a wheel support bearing assembly, which are rotatable relative to each other through rolling elements, which device includes an annular sealing plate fitted to the inner member and an annular elastic sealing member fitted to the outer members and the annular sealing plate and the annular elastic sealing member confront with each other. The sealing plate is made of a metallic material and has an L-shaped section including a first cylindrical wall, mounted on an outer periphery of the inner member, and a first radial upright wall protruding from one end of the first cylindrical wall. The elastic sealing member includes an annular core metal and an elastic body secured to the core metal. The core metal is opposed to the sealing plate and is of an L-shaped section including a second cylindrical wall, which is mounted on an inner peripheral surface of the outer member, and a second radial upright wall extending radially inwardly from one end of the second cylindrical wall. The elastic body includes two side sealing lips juxtaposed radially inwardly and outwardly on the core metal, and having respective tips held in contact with the first radial upright wall of the sealing plate, the distance between those side sealing lips being equal to or greater than 0.1 mm.

As hereinabove described, when the distance between the two side sealing lips of the elastic sealing member is chosen to be equal to or greater than 0.1 mm, the sectional height can be reduced without the resistance to muddy water being lowered. For example, even in the case where the sectional height is reduced to a value equal to 6 mm, the resistance to muddy water about equal to that exhibited by the conventional bearing sealing device, which employs the two side sealing lips and has the sectional height is large, can be secured.

In the present invention, the elastic body may be provided with a radial sealing lip extending in a direction towards the first cylindrical wall of the sealing plate and operable to prevent a leakage of grease, or without such radial sealing lip the sealing device sectional height H, which is a radial length as measured from an inner diametric surface of the sealing plate to an outer diametric surface of the elastic sealing member, may be within the range of 6 to 8 mm and the distance between the two side sealing lips is chosen to be within the range of 0.1 to 2.0 mm.

Although the elastic body may not be provided with any radial sealing lip, the use of the radial sealing lip is effective to avoid an undesirable leakage of grease inside the wheel support bearing assembly from the bearing sealing device to the outside. As has been discussed in connection with the conventional example, if the sectional height is reduced, it is advantageous in terms of reduction in weight and size of the wheel support bearing assembly, but depending on the bearing specification, it may occur that reduction of the section may result in increase of the weight of a bearing assembling component parts. In view of the above, the sectional height H is chosen to be equal to or smaller than 8 mm to enable reduction in weight and size to a certain extent and, on the other hand, the sectional height H is chosen to be equal to or greater than 6 mm, and an increase of the weight of bearing assembling component parts in the wheel support bearing assembly for the standard passenger car is avoided. This sealing device sectional height is chosen to be within the range of 6 to 8 mm and further, by choosing the distance between the two side sealing lips to be equal to or greater than 0.1 mm the resistance to muddy water is secured and, on the other hand, by choosing it to be equal to or smaller than 2.0 mm, an increase of the sealing device sectional height H is avoided. In this way, it is possible to reduce the sectional height enough to allow the wheel support bearing assembly to be manufactured compact in size and light in weight and, at the same time, it is made possible to increase the resistance to muddy water.

In the present invention, the ratio H/B of the sealing device sectional height H relative to a sealing device width B, which is an axial dimension of a combination of the sealing plate and the elastic sealing member, may be chosen to be within the range of 1.2 to 1.8. If the ratio H/B is smaller than 1.2, it is difficult to achieve the required sealing device sectional height, for example, 6 mm or greater. Also, if the ratio H/B exceeds over 1.8, the sealing device width B is so small as to make it difficult to secure the resistance to muddy water. Only when the ratio H/B is chosen to be within the range of 1.2 to 1.8, the height required for the sealing device sectional height H can be secured, the width of the sealing device width B can be made satisfying the required width, and, also, reduction in the sectional height of the bearing sealing device and increase of the resistance to muddy water can be made compatible.

The radial sealing lip referred to above may be of a structure held in proximity to an outer peripheral surface of the first cylindrical wall of the sealing plate to thereby form a labyrinth seal. If it is a labyrinth seal, an undesirable leakage of grease can be avoided and, also, since it is non-contact, an undesirable increase of the torque resulting from a sliding contact of the lip can be avoided.

In the present invention, the elastic body may have an inner peripheral surface representing a flat sectional shape. In other words, the use of the radial sealing lip on an inner diametric side may be dispensed with. In the case of this construction, although an effect of avoiding an undesirable leakage of grease, which has been exhibited by the presence of the radial sealing lip, is no longer available, there is a room for a gap present between the inner peripheral surface of the elastic body in the elastic sealing member and the outer peripheral surface of the cylindrical wall of the sealing plate and, therefore, by adjusting this gap, not only can reduction of the sectional height be accomplished, but an effect of a labyrinth seal can also be obtained.

In the present invention, the elastic body includes, in addition to the two side sealing lips, two radial sealing lips extending axially and having their tips held in contact with or in proximity to an outer peripheral surface of the sealing plate and the sealing device sectional height H, which is a radial length as measured from an inner diametric surface of the sealing plate to an outer diametric surface of the elastic sealing member, is within the range of 9 to 15 mm.

According to this construction, since it includes the two side sealing lips, held in contact with the first radial upright wall of the sealing plate, and the two radial sealing lips, having their tips held in contact with or in proximity to the outer peripheral surface of the sealing plate, an excellent resistance to muddy water can be obtained. Also, since the sectional height H of the sealing device is chosen to be within the range of 9 to 15 mm, the resistance to muddy water can be increased without the weight being increased. If the sealing device sectional height is of a value smaller than 9 mm, the bearing sealing device of the structure including the above described two side sealing lips and the above described two radial sealing lips does not establish. Also, if it is greater than 15 mm, the radial dimension of the wheel support bearing assembly will increase, resulting in an undesirable increase of the weight of the wheel support bearing assembly.

In the present invention, one of the two radial sealing lips may be provided with a ring shaped spring member for radially inwardly biasing such radial sealing lip.

In the construction, in which as hereinabove described, the ring shaped spring member is provided for radially inwardly biasing the radial sealing lip, the contact of the radial sealing lip with the first cylindrical wall of the sealing plate can be enhanced and, at the same time, the lip follow-up characteristic of the radial sealing lip to offset during assemblage of the bearing assembly onto the automotive vehicle can be increased and, therefore, the effect of preventing the ingress of muddy water by the radial sealing lip can be increased further.

In the present invention, the side sealing lip on an inner diametric side may be made to extend from a tip of one of the two radial sealing lips to form a sealing lip of one piece structure. In the case of this construction, the sealing lip structure of the bearing sealing device can be simplified and, therefore, it becomes easy to suppress the sealing device sectional height H to be equal to or smaller than 15 mm.

In the present invention, the sealing lip, in which the side sealing lip and the radial sealing lip are integrated together, may be provided with a ring shaped spring member for radially inwardly biasing such radial sealing lip. In the case of this construction, not only can the sealing lip structure of the bearing sealing device be simplified enough to enable the sealing device sectional height H to be suppressed to a value equal to or smaller than 15 mm, but also the contact of the side sealing lip and the radial sealing lip with the first radial upright wall and the first cylindrical wall of the sealing plate can be enhanced and the lip follow-up characteristic of the radial sealing lip to offset during assemblage of the bearing assembly onto the automotive vehicle can be increased, and therefore, the effect of preventing the ingress of muddy water by the radial sealing lip can be increased further.

A wheel support bearing assembly designed in accordance with the present invention is a wheel support bearing assembly including outer and inner members rotatable relative to each other through a plurality of rows of rolling elements and operable to support a vehicle wheel rotatably relative to a vehicle body structure, in which a bearing sealing device according to any one of the foregoing constructions of the present invention is provided on one or both of inboard and outboard ends of a bearing space delimited between the outer and inner members.

According to this construction, reduction in weight can be accomplished as a result of compactization of the axial direction and the radial direction of the wheel support bearing assembly and increase of the resistance to muddy water in turn increases the durability.

In the wheel support bearing assembly according to the present invention, the outer member may be a rotatable member, in which case the bearing sealing device according to any one of the constructions of the present invention is provided on the inboard end of the bearing space. In other words, in a wheel support bearing assembly of an outer ring rotating model of a second generation type, the bearing sealing device of the present invention may be provided on the inboard end.

In the wheel support bearing assembly according to the present invention, the inner member may include a hub axle, having a wheel mounting hub flange and a shank portion, and an inner ring mounted on an outer periphery of an inboard end of the shank portion of the hub axle, in which case the hub axle and the inner ring have respective rows of rolling surfaces formed therein for the rolling elements to roll therealong. In other words, it may be applied to a wheel support bearing assembly of a third generation type.

In the wheel support bearing assembly according to the present invention, the inner member may include a hub axle, having a wheel mounting hub flange and a shank portion, and an outer coupling member forming a part of a constant velocity universal joint and, in which case a stem portion of the outer coupling member is coupled with the hub axle and the hub axle and the outer coupling member have respective rows of rolling surfaces formed therein for the rolling elements to roll therealong. In other words, it may be applied to a wheel support bearing assembly of a fourth generation type.

In the wheel support bearing assembly according to the present invention, the wheel support bearing assembly may be a double row tapered roller bearing design. By way of example, it may be a wheel support bearing assembly for use in trucks or the like.

In the wheel support bearing assembly according to the present invention, the wheel support bearing assembly may be a double row contact ball bearing design. By way of example, it may be a wheel support bearing assembly for use in standard passenger cars.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

BEST MODE FOR CARRYING OUT THE INVENTION

Figure 1:
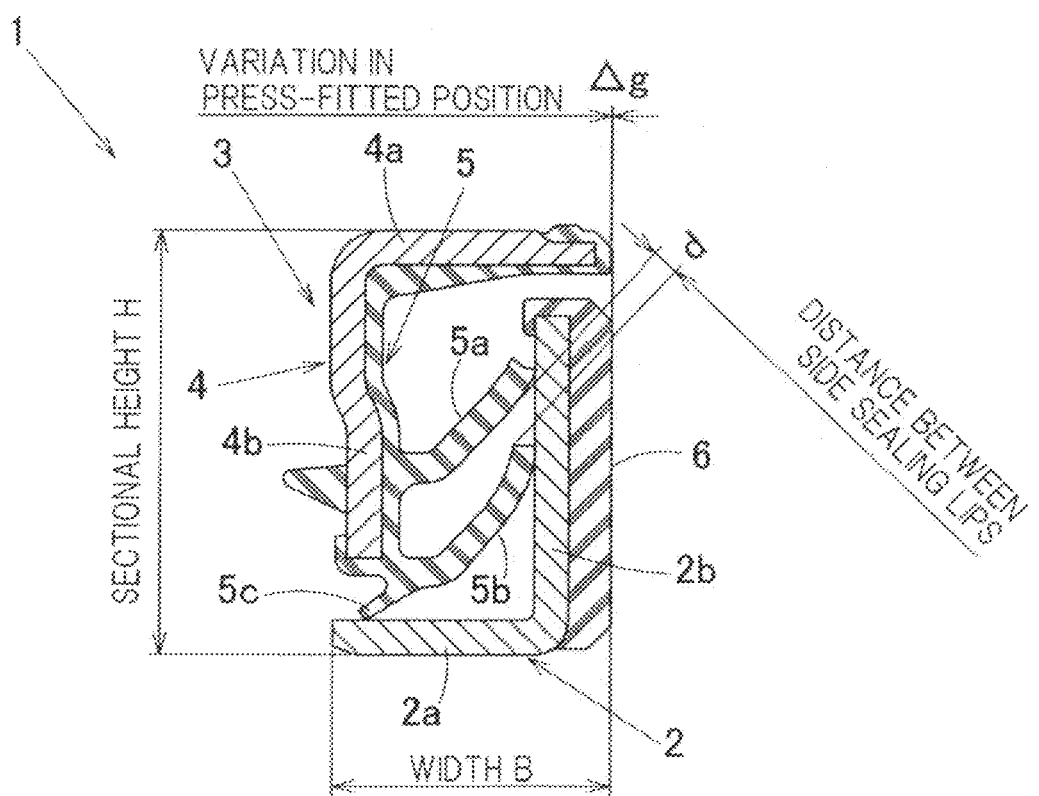
FIG. 1 is a longitudinal sectional view of a bearing sealing device according to a first preferred embodiment of the present invention.

A first preferred embodiment of the present invention will now be described in detail with particular reference to FIGS. 1 and 2. A bearing sealing device 1 according to this embodiment is, as shown in FIG. 2, provided in a wheel support bearing assembly 20 to seal opposite axial ends of an annular space delimited between an outer member 21 and an inner member 22 that rotate relative to each other. The wheel support bearing assembly 20 is for rotatably supporting a vehicle wheel relative to a vehicle body structure and is, in the illustrated embodiment, rendered to be of a double row outwardly oriented angular contact ball bearing type that is classified as a first generation model. It is to be noted that in the description that follows, one side of a vehicle body structure laterally away from the longitudinal center thereof in a condition, in which the bearing assembly is mounted on the vehicle body structure, is referred to as "outboard" whereas the opposite side of the vehicle body structure laterally close towards the longitudinal center thereof in the same condition is referred to as "inboard". This wheel support bearing assembly 20 includes the outer member 21 having an inner periphery formed with a plurality of rows of rolling surfaces 24, the inner member 22 having rolling surfaces 25 having an outer periphery defined in face-to-face relation with the respective rolling surfaces 24, and double row rolling elements 23 interposed between the pluralities of rows of those rolling surfaces 24 and 25. The inner member 22 is made up of a split type inner ring, in which two bearing inner rings 22A are axially disposed. The rolling elements 23 are in the form of balls and are retained by a retainer 26 employed for each row. In the illustrated embodiment, the outer member 21 is rendered to be a stationary member whereas the inner member 22 is rendered to be a rotatable member.

Figure 2:
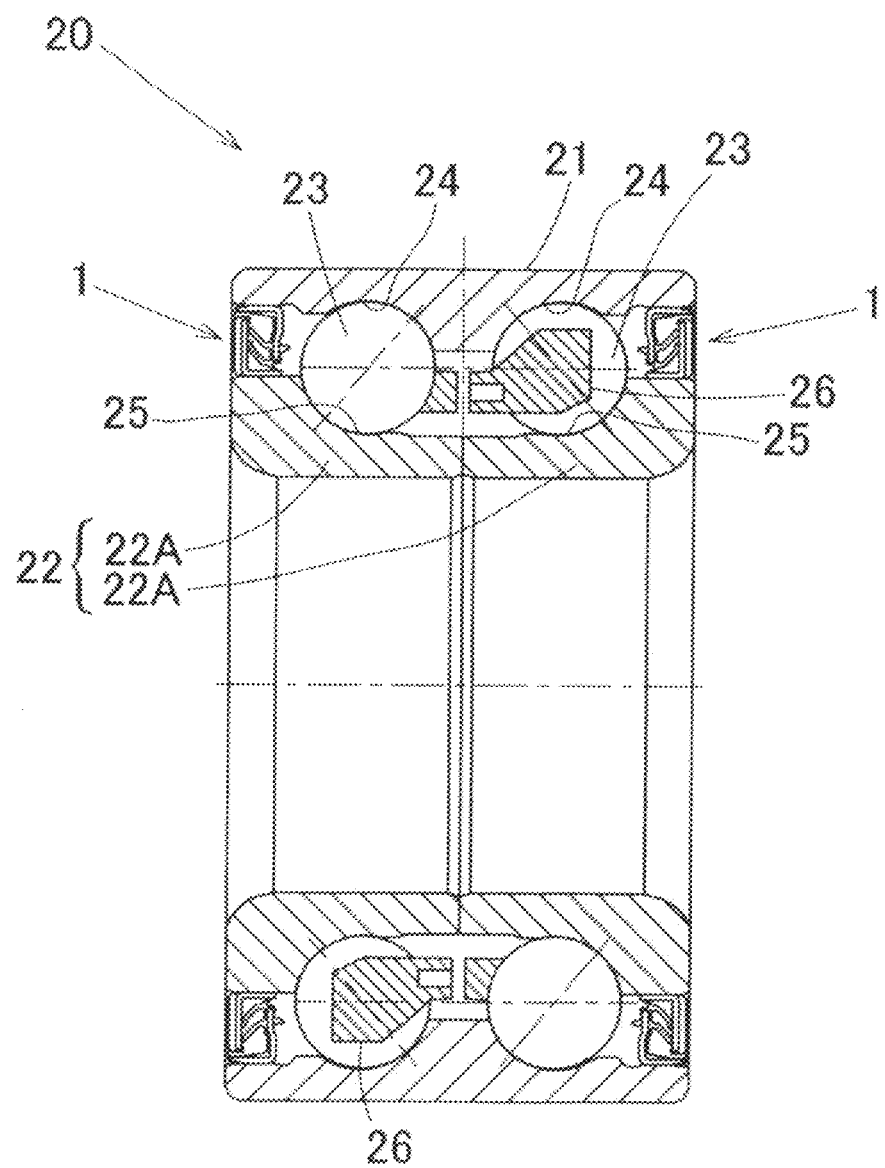
FIG. 2 is a longitudinal sectional view of a first constructional example of a wheel support bearing assembly provided with the bearing sealing device.

As best shown in FIG. 1, the bearing sealing device 1 includes an annular sealing plate 2 and an annular elastic sealing member 3, which are opposed to each other and are fitted to the inner member 22 and the outer member 21, respectively.

The sealing plate 2 is rendered to be an L-sectioned metallic member, including an axially extending cylindrical wall 2a, adapted to be mounted on an outer peripheral surface of the inner member 22, and an radial upright wall 2b protruding radially outwardly from one end of the cylindrical wall 2a, and, for example, is rendered to be a product prepared from a sheet metal by the use of a press work. An outwardly oriented surface of the radial upright wall 2b of this sealing plate 2 is provided with a multipolar magnet 6 in the form of a rubber magnet bonded by vulcanization thereto. The multipolar magnet 6 is an annular member having a plurality of magnetic poles arranged in a direction circumferentially thereof. Accordingly, the sealing plate 2 is concurrently utilized as a slinger and as a magnetic encoder. In other words, the sealing plate 2 and a magnetic sensor (not shown) disposed in face-to-face relation with an outwardly oriented surface of the multipolar magnet 6 cooperate together to define a rotation detecting device for detecting the rotation of the inner member 22, which is the rotatable member. Other than the rubber magnet, the multipolar magnet 6 may be a plastic magnet, a sintered magnet or a processed product of magnet material.

The elastic sealing member 3 is of a type including an annular core metal 4 and an elastic body 5 fixed to such core metal 4. The core metal 4 includes an axially extending cylindrical wall 4a, adapted to be mounted on an inner peripheral surface of the outer member 21, and a radial upright wall 4b extending radially inwardly from one end of the cylindrical wall 4a, and is rendered to have a reversed L-shaped section and opposed axially to the sealing plate 2. This core metal 4 is, for example, rendered to be a product prepared from a metal sheet by the use of a press work. The elastic body 5 is provided to cover an inner side of the core metal 4 and has two side sealing lips 5a and 5b and a radial sealing lip 5c. The two side sealing lips 5a and 5b are arranged radially inwardly and outwardly of the core metal 4 while extending diagonally radially outwardly from the radial upright wall 4b of the core metal 4 in generally parallel relation to each other, with their tips terminating in contact with the radial upright wall 2b of the sealing plate 2. The radial sealing lip 5c is for the purpose of avoiding an undesirable leakage of grease and extends diagonally radially inwardly from a free end of the radial upright wall 4b of the core metal 4 in a direction counter to the radial upright wall 2b of the sealing plate 2, with its tip terminating in contact with the cylindrical wall 2a of the sealing plate 2.

The distance d between the two side sealing lips 5a and 5b of the elastic sealing member 3 is chosen to be not smaller than 0.1 mm when the respective free ends of those side sealing lips 5a and 5b are held in contact with the radial upright wall 2b of the sealing plate 2. In the illustrated embodiment, the distance d is rendered to be within the range of 0.1 to 2.0 mm. This range of the distance d is secured even in the worst condition of variation in the press-fitted position (variation Δg in axial position of the sealing plate 2 and the elastic sealing member 3) during assemblage into the bearing assembly. The distance d referred to above is a distance measured at the respective tips of those two side sealing lips 5a and 5b in a direction perpendicular to the direction of extension of the two side sealing lips 5a and 5b in generally parallel relation to each other. Also, the sectional height H of the sealing device, which is the radial length as measured from an inner diametric surface of the sealing plate 2 to an outer diametric surface of the elastic sealing member 3, is rendered to be within the range of 6 to 8 mm. In addition, the ratio H/B of the sealing device sectional height H relative to the width B of the sealing device, which width is the axial dimension of a combination of the sealing plate 2 and the elastic sealing member 3, is rendered to be within the range of 1.2 to 1.8.

As hereinabove described, since in the bearing sealing device 1 of the structure hereinabove described, the distance d between the two side sealing lips 5a and 5b of the elastic sealing member 3 is chosen to be of a value equal to or greater than 0.1 mm, the sectional height H can be reduced without the resistance to muddy water being lowered. By way of example, even when the sectional height H is reduced to 6 mm, the resistance to muddy water about equal to that exhibited by the conventional bearing sealing device utilizing the two side sealing lips and having a large sectional height can be secured.

As discussed in connection with the conventional example, if the sectional height H is reduced, it is advantageous in terms of reduction in weight and size of the wheel support bearing assembly, but depending on the bearing specification, it may occur that reduction of the sectional height may result in increase of the weight of a bearing assembling component parts. In view of the above, in the illustrated embodiment, the sectional height is chosen to be within the range of 6 to 8 mm to enable reduction in weight and size to a certain extent and, on the other hand, the distance d between the two side sealing lips $5a$ and $5b$ is chosen to be within the range of 0.1 to 2.0 mm in dependence on the sectional height so chosen. In this way, reduction in sectional height can be accomplished to such an extent as to enable the bearing sealing device to have the sectional height H effective to reduce the weight and size of the wheel support bearing assembly and, also, the resistance to muddy water can be increased.

Also, in this embodiment now under discussion, the ratio H/B of the sealing device sectional height H relative to the sealing device width B is chosen to be within the range of 1.2 to 1.8 and, accordingly, both of the reduction of the sectional height and the resistance to muddy water, discussed above, can be made compatible.

In addition, in the wheel support bearing assembly 20 according to a first constructional example shown in FIG. 2, in which the bearing sealing device 1 of the structure hereinabove described is employed, reduction in weight can be accomplished as a result of compactization in axial and radial directions and increase of the resistance to muddy water in turn increases the durability.

Figure 3:
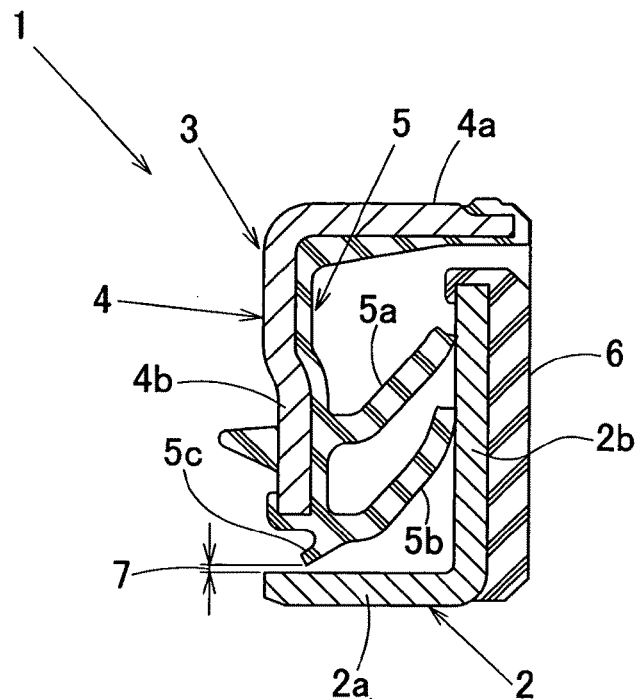
FIG. 3 is a longitudinal sectional view of the bearing sealing device according to a second preferred embodiment of the present invention.

FIG. 3 illustrates a second preferred embodiment of the bearing sealing device 1. In this embodiment, the radial sealing lip $5c$ of the elastic sealing member 3, which is employed in the practice of the first embodiment shown in and described with particular reference to FIG. 1, is held in proximity to the outer peripheral surface of the cylindrical wall $2a$ of the sealing plate 2 to define a labyrinth seal 7. Other structural features are similar to those shown in and described in connection with the first embodiment with particular reference to FIG. 1.

Even where as described above the radial sealing lip $5c$ is held in proximity to the outer peripheral surface of the cylindrical wall $2a$ of the sealing plate 2 to define the labyrinth seal 7, an undesirable leakage of grease can be avoided. In such case, an undesirable increase of the torque resulting from a sliding contact of the radial sealing lip $5c$ can also be avoided.

Figure 4:
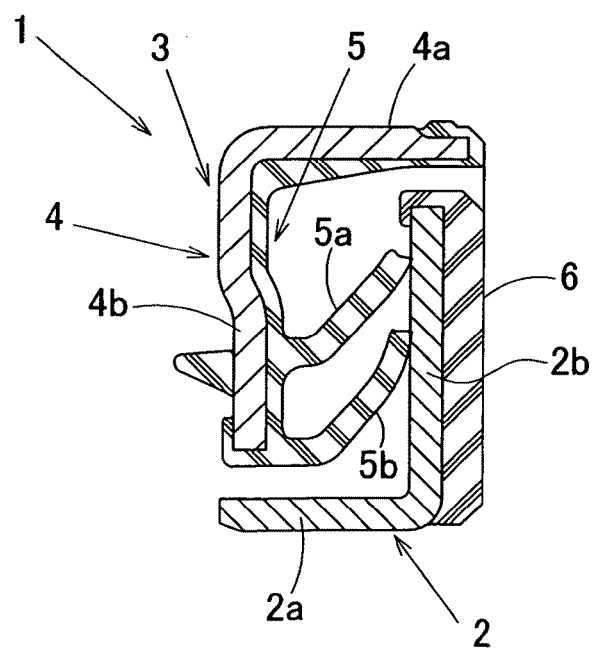
FIG. 4 is a longitudinal sectional view of the bearing sealing device according to a third preferred embodiment of the present invention.

FIG. 4 illustrates a third preferred embodiment of the bearing sealing device 1. In this embodiment, the inner peripheral surface of the elastic body 5 in the elastic sealing member 3 employed in the first embodiment shown in and described with particular reference to FIG. 1 is designed to have a flat sectional shape and the radial sealing lip $5c$ employed in the first embodiment of FIG. 1 is dispensed with. The flat sectional shape referred to above means a shape represented by a cylindrical surface having the inner diameter that is uniform over the axial direction.

Where the bearing sealing device is so constructed as hereinabove described, an effect of avoiding an undesirable leakage of grease, which has been exhibited by the presence of the radial sealing lip $5c$, is no longer available, but there is a room for a gap present between the inner peripheral surface of the elastic body 5 in the elastic sealing member 3 and the outer peripheral surface of the cylindrical wall $2a$ of the sealing plate 2 and, therefore, by adjusting this gap, not only can reduction of the sectional height H be accomplished, but an effect of a labyrinth seal can also be obtained.

Figure 5:
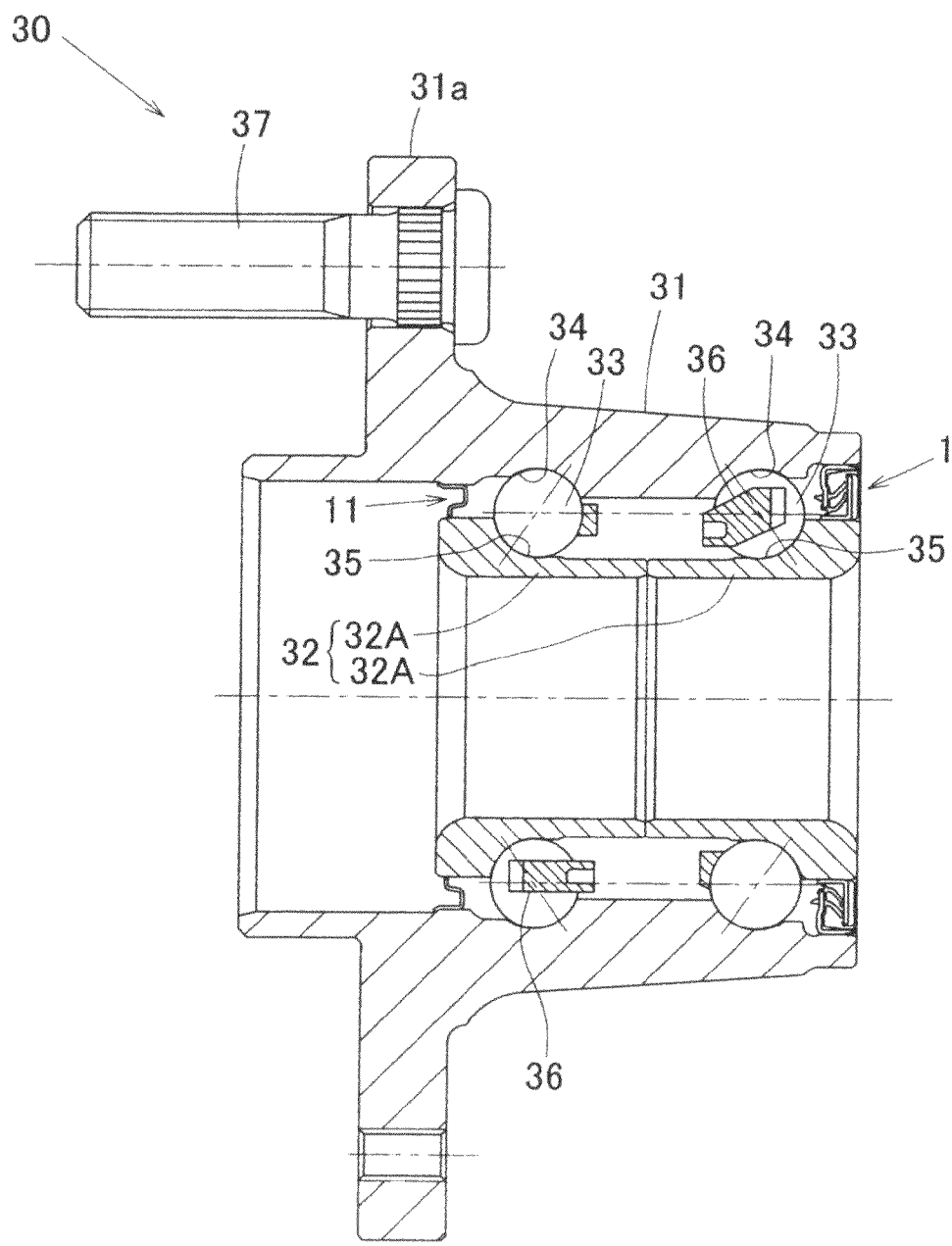
FIG. 5 is a longitudinal sectional view of a second constructional example of the wheel support bearing assembly provided with the bearing sealing device shown in FIG. 1.

FIG. 5 illustrates a second constructional example of the wheel support bearing assembly provided with the bearing sealing device 1 according to the first embodiment shown in and described with particular reference to FIG. 1. This wheel support bearing assembly, now identified by 30, is of a double row outwardly oriented angular contact ball bearing design classified as a second generation type, which is an outer ring rotating type and is used for rotatably supporting a vehicle driven wheel. This wheel support bearing assembly 30 includes an outer member 31 concurrently serving as a hub axle and having an inner periphery formed with double row rolling surfaces 34, an inner member 32 having rolling surfaces 35 formed in face-to-face relation with those rolling surfaces 34, and double row rolling elements 33 interposed between those double row rolling surfaces 34 and 35. The outer member 31 includes a hub flange $31a$ defined in an outer periphery thereof for supporting a vehicle wheel mounted thereon. This hub flange $31a$ carries the vehicle wheel (not shown) through a brake rotor (also not shown) by means of hub bolts 37. The inner member 32 is of a split type inner ring that includes two bearing inner rings 32A and 32A having respective rolling surfaces 35 and arranged in the axial direction. A wheel axle (not shown) is fixed to an inner diametric surface of the inner member 32. The rolling elements 33 are in the form of balls and retained by a retainer 36 employed for each of the rows. Opposite ends of an annular space delimited between the inner and outer members 32 and 31 are sealed by respective bearing sealing devices 1 and 11. As the bearing sealing device 1 on the inboard side, the bearing sealing device shown in FIG. 1 and described in connection with the first embodiment of the present invention is employed.

Figure 6:
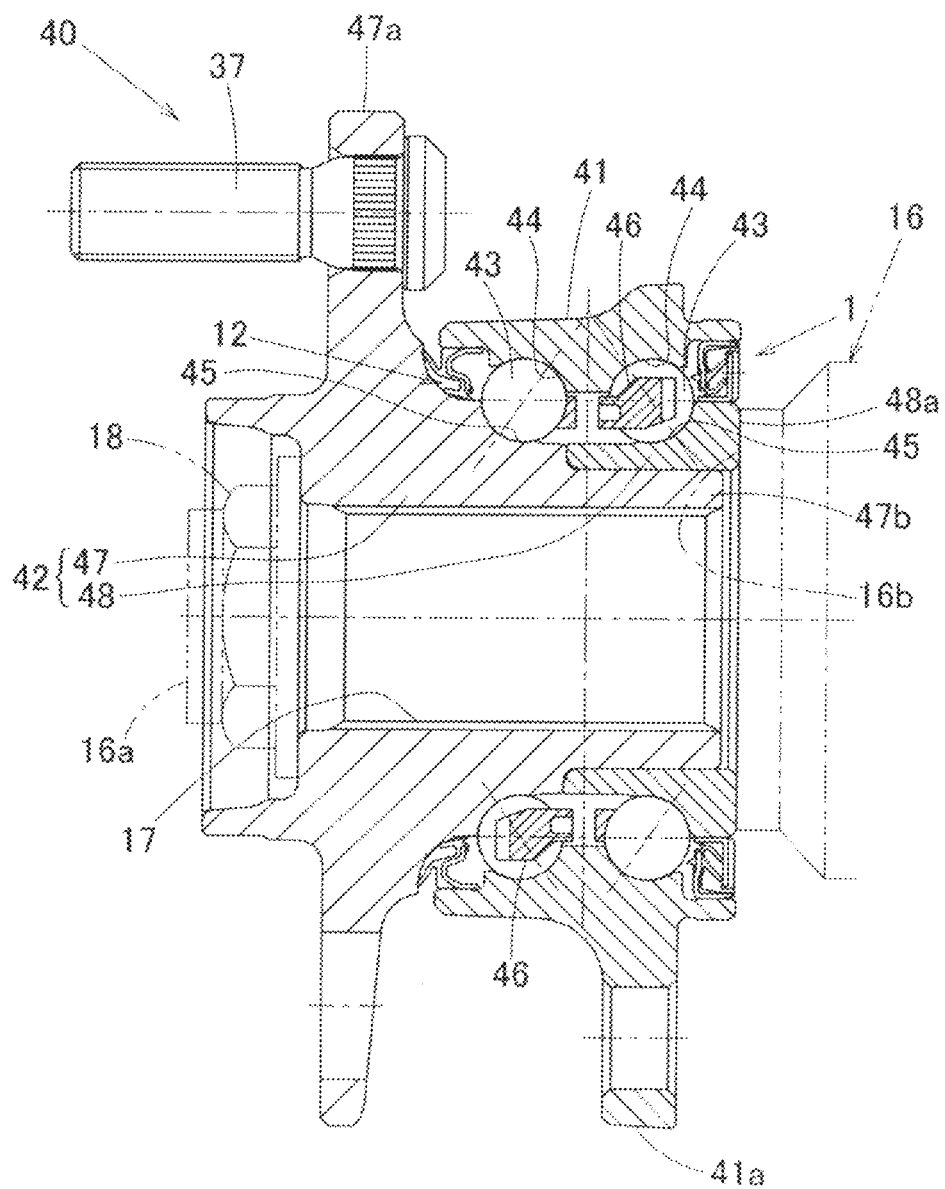
FIG. 6 is a longitudinal sectional view of a third constructional example of the wheel support bearing assembly provided with the bearing sealing device shown in FIG. 1.

FIG. 6 illustrates a third constructional example of the wheel support bearing assembly provided with the bearing sealing device 1 designed in accordance with the first embodiment shown in FIG. 1. This wheel support bearing assembly, now identified by 40, is of a double row outwardly oriented angular contact ball bearing design classified as a third generation type and is an inner ring rotating type and is used for rotatably supporting a vehicle drive wheel. This wheel support bearing assembly 40 includes an outer member 41 having an inner periphery formed with double row rolling surfaces 44, an inner member 42 having rolling surfaces 45 formed in face-to-face relation with those rolling surfaces 44, and double row rolling elements 43 interposed between those double row rolling surfaces 44 and 45. The outer member 41 serves as a stationary member and has its outer periphery formed with a flange $41a$ adapted to be fitted to a knuckle of an automobile suspension system (not shown), the entirety of which is of one piece construction. The inner member 42 serves as a rotatable member and includes a hub axle 47, having its outer periphery formed with a wheel mounting hub flange $47a$, and an inner ring 48 mounted on an outer periphery of an inboard end of a shank portion $47b$ of the hub axle 47. The rows of the rolling surfaces 45 referred to previously are formed on the hub axle 47 and the inner ring 48, respectively. The rolling elements 43 are in the form of balls and are retained by a retainer 46 employed for each of the rows. Opposite ends of an annular space delimited between the inner and outer members 42 and 41 are sealed by respective bearing sealing devices 1 and 12. For the bearing sealing device 1 on the inboard side, the bearing sealing device of the structure shown in FIG. 1 and described in connection with the first embodiment is employed.

In mounting the wheel support bearing assembly 40 onto the automotive vehicle, a stem portion 16a of an outer coupling member 16, forming a part of a constant velocity universal joint, is passed into a throughhole 17 defined in the hub axle 47 with an outer peripheral surface of the stem portion 16a splined to an inner peripheral surface of the throughhole 17, followed by fastening a nut 18 threadingly on a free end of the stem portion 16a to thereby connect the outer coupling member 16 together with the inner member 42. Here, an outboard end face 16b of the outer coupling member 16 is urged against an end face 48a of the inner ring 48, then oriented towards the inboard side, with the inner member 42 consequently clamped widthwise between the outboard end face 16b of the outer coupling member 16 and the nut 18. The wheel mounting hub flange 47a is positioned at an outboard end of the hub axle 47, and the vehicle wheel (not shown) is fitted to the hub flange 47a through a brake rotor (also not shown) by means of hub bolts 37.

Figure 7:
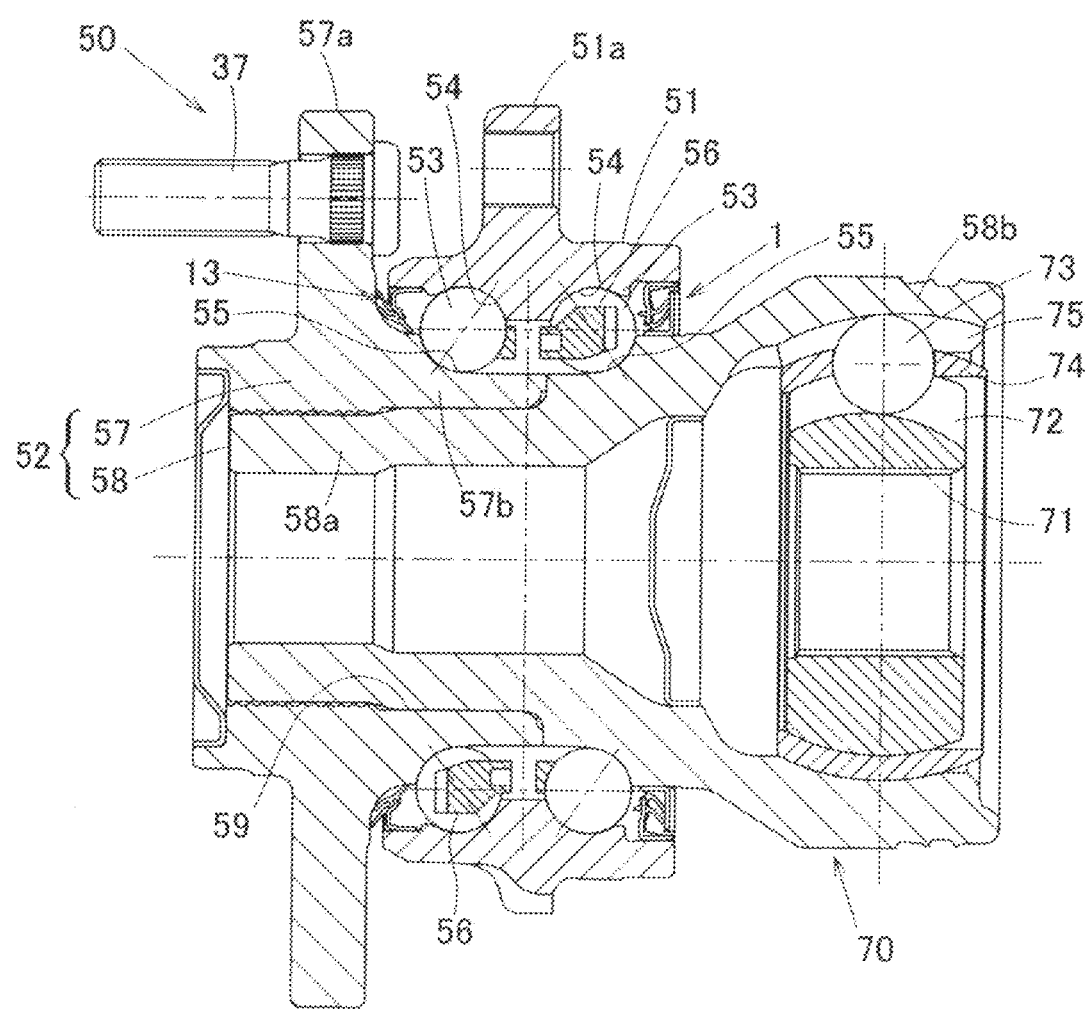
FIG. 7 is a longitudinal sectional view of a fourth constructional example of the wheel support bearing assembly provided with the bearing sealing device shown in FIG. 1.

FIG. 7 illustrates a fourth constructional example of the wheel support bearing assembly provided with the bearing sealing device 1 designed in accordance with the first embodiment shown in FIG. 1. This wheel support bearing assembly, now identified by 50, is of a double row outwardly oriented angular contact ball bearing design classified as a fourth generation type and is an inner ring rotating type and is used for rotatably supporting a vehicle drive wheel. This wheel support bearing assembly 50 includes an outer member 51 having an inner periphery formed with double row rolling surfaces 54, an inner member 52 having rolling surfaces 55 formed in face-to-face relation with those rolling surfaces 54, and double row rolling elements 53 interposed between those double row rolling surfaces 54 and 55. The rolling elements 53 are in the form of balls and are retained by a retainer 56 employed for each of the rows. Opposite ends of an annular space delimited between the inner and outer members 52 and 51 are sealed by respective bearing sealing devices 1 and 13. For the bearing sealing device 1 on the inboard side, the bearing sealing device of the structure shown in FIG. 1 and described in connection with the first embodiment is employed.

The outer member 51 serves as a stationary member and has its outer periphery formed with a flange 51a adapted to be fitted to a knuckle of an automobile suspension system (not shown), the entirety of which is of one piece construction. The inner member 52 serves as a rotatable member and includes a hub axle 57, having an outer periphery of a shank portion 57b formed with a wheel mounting hub flange 57a, and an outer coupling member 58 of a constant velocity universal joint 70, which has a stem portion 58a passed into a center bore 59 in the hub axle 57 and engaged thereto. The rows of the rolling surfaces 55 referred to previously are formed on the hub axle 57 and the outer coupling member 58, respectively. The vehicle wheel (not shown) is fitted to the hub flange 57a on the hub axle 57 through a brake rotor (also not shown) by means of hub bolts 37. The constant velocity universal joint 70 includes a plurality of first axially extending grooves 75, provided on an inner spherical surface of a cup shaped portion 58b of the outer coupling member 58, and a plurality of second axially extending grooves 72 formed on an outer spherical surface of an inner coupling member 71, torque transmitting balls 73 interposed between the first axially extending grooves 75 and the second axially extending grooves 72, and a retainer 74 retaining the torque transmitting balls 73 therein.

Figure 8:
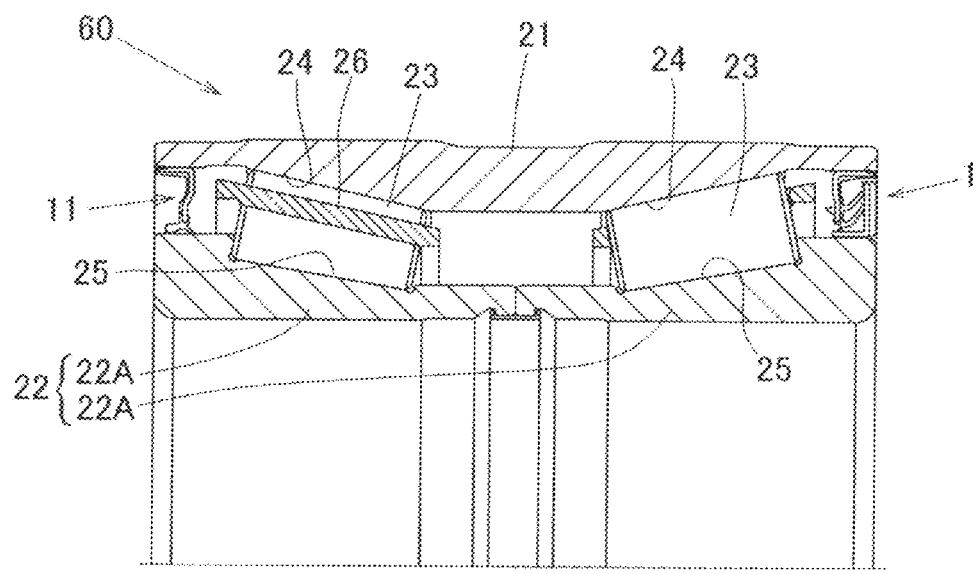
FIG. 8 is a longitudinal sectional view of a fifth constructional example of the wheel support bearing assembly provided with the bearing sealing device shown in FIG. 1.

FIG. 8 illustrates a fifth constructional example of the wheel support bearing assembly provided with the bearing sealing device 1 designed in accordance with the first embodiment shown in FIG. 1. This wheel support bearing assembly, now identified by 60, is rendered to be a double row tapered roller bearing design classified as a first generation type. In other words, the wheel support bearing assembly 60 is a version, in which the rolling elements 23 employed in the wheel support bearing assembly 20 shown in and described with particular reference to FIG. 2 are replaced with tapered rollers, and opposite ends of an annular space delimited between the inner and outer members 22 and 21 are sealed by the respective bearing sealing devices 1 and 11. For the bearing sealing device 1 on the inboard side, the bearing sealing device of the structure shown in FIG. 1 and described in connection with the first embodiment is employed. The feature that the inner member 22 is of a split type inner ring made up of the two bearing inner rings 22A that are axially juxtaposed is similar to that of the first constructional example shown in and described with particular reference to FIG. 2.

Figure 9:
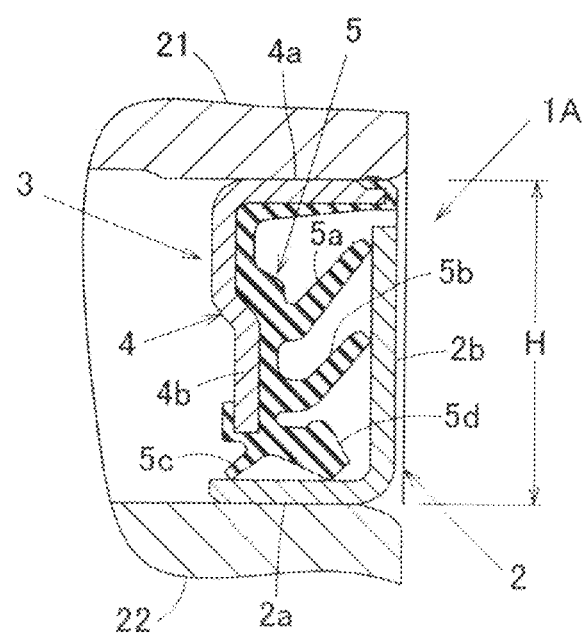
FIG. 9 is a longitudinal sectional view of the bearing sealing device according to a fourth preferred embodiment of the present invention.

FIG. 9 illustrates a fourth preferred embodiment of the bearing sealing device, which is now identified by 1A. In contrast to the bearing sealing device according to the previously described first embodiment, which makes use of the radial sealing lip 5c for the prevention of the grease leakage, in addition to the two side sealing lips 5a and 5b for the prevention of ingress of muddy water from the outside, or does not make use of the radial sealing lip 5c, the fourth embodiment shown in FIG. 4 differs from that according to the first embodiment in that in addition to the two side sealing lips 5a and 5b, the use is made of two, axially juxtaposed radial sealing lips 5c and 5d having their tips held in contact with or in proximity to the outer peripheral surface of the sealing plate 2 and the sealing device sectional height H, which is the radial length from the inner diametric surface of the sealing plate 2 in the bearing sealing device 1A to the outer diametric surface of the elastic sealing member 3, is chosen to be within the range of 9 to 15 mm. Other structural features are similar to those in the previously described first embodiment shown in FIG. 1 and, therefore, the details thereof are not reiterated for the sake of brevity while like parts are designated by like reference numerals. Of the two radial sealing lips 5c and 5d, the radial sealing lip 5c is used for the prevention of the grease leakage as is the case with that in the previously described first embodiment, but the other radial sealing lip, that is, the radial sealing lip 5d is employed for the prevention of ingress of muddy water as is the case with the side sealing lips 5a and 5b.

Figure 10:
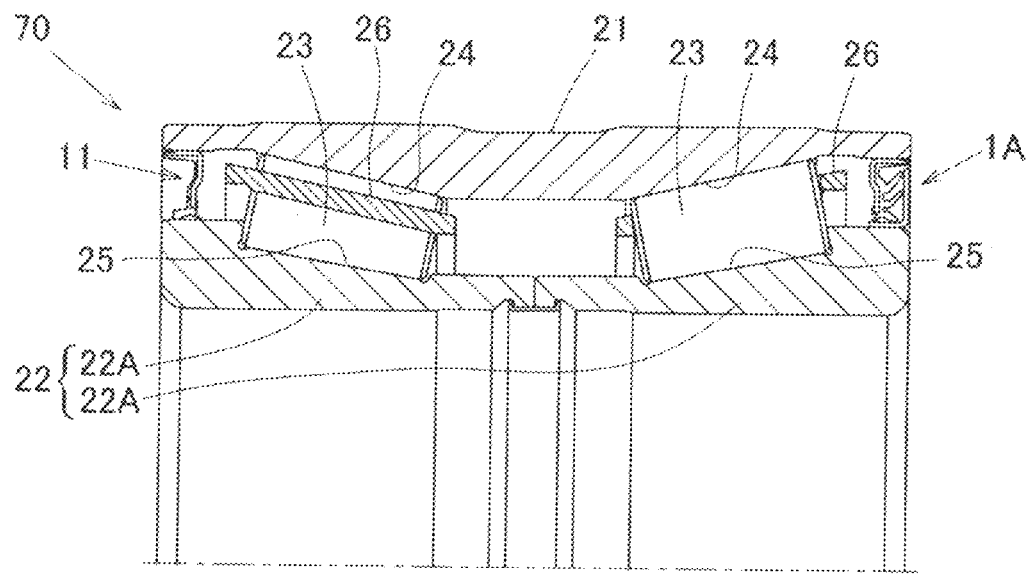
FIG. 10 is a longitudinal sectional view of a sixth constructional example of the wheel support bearing assembly provided with the bearing sealing device shown in FIG. 9.

FIG. 10 illustrates a sixth constructional example of the wheel support bearing assembly equipped with the bearing sealing device 1A designed in accordance with the fourth embodiment shown in and described with reference to FIG. 9. The wheel support bearing assembly according to this embodiment, now identified by 70, is an application to a wheel support bearing assembly of a double row tapered roller bearing design classified as a first generation type as is the case with the fifth constructional example of the wheel support bearing assembly shown in and described with particular reference to FIG. 8 and, therefore, like parts are designated by reference numeral and the details thereof are not reiterated for the sake of brevity.

As hereinabove described, in the wheel support bearing assembly 70 of the structure described above, since the sealing device sectional height H (FIG. 9) in the bearing sealing device 1A provided at the inboard end of the bearing space is chosen to be within the range of 9 to 15 mm, the resistance to muddy water can be increased. If the sealing device sectional height H is reduced to a value smaller than 9 mm, the bearing sealing device 1A of the structure including the two side sealing lips 5a and 5b and the two radial sealing lips 5c and 5c does not establish, but if it is increased to a value greater than 15 mm, the radial dimension of the wheel support bearing assembly 70 will increased, accompanied by an undesirable increase of the weight of the wheel support bearing assembly 70. Accordingly, with the wheel support bearing assembly 70, the resistance to muddy water can be increased without incurring any increase in weight. It is to be noted that although the wheel support bearing assembly 70 shown in FIG. 10 has been shown and described as having only the inboard end of the bearing space sealed by the bearing sealing device 1A of the structure shown in and described with particular reference to FIG. 9, the outboard end of the same bearing space may be sealed by the use of a bearing sealing device identical in structure with the bearing sealing device 1A of the above described structure. In general, the inboard end of the bearing space in the wheel support bearing assembly is susceptible to ingress of muddy water and the outboard end thereof is less susceptible to ingress of muddy water, and, therefore, the sealing device 11 used at the outboard end of the bearing space may suffice to be of a simple structure.

Figure 11:
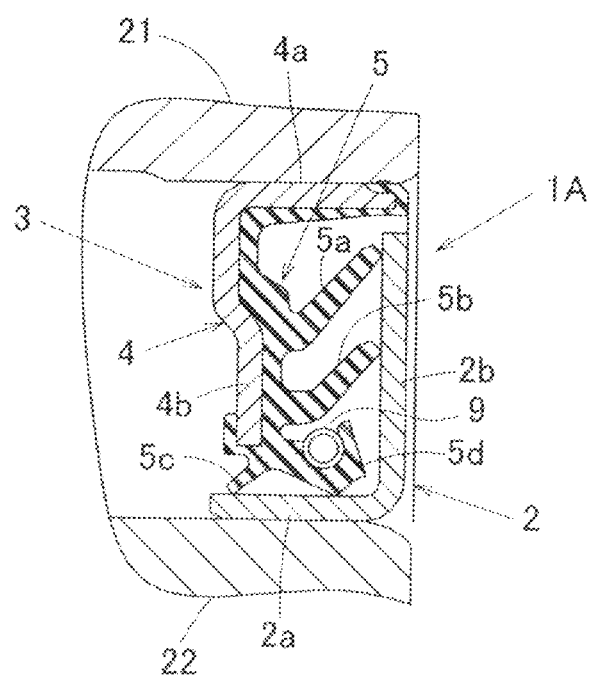
FIG. 11 is a longitudinal sectional view of the bearing sealing device according to a fifth preferred embodiment of the present invention.

FIG. 11 illustrates a fifth preferred embodiment of the bearing sealing device 1. In this fifth embodiment, of the two radial sealing lips 5c and 5d employed in the fourth embodiment shown in and described with particular reference to FIG. 9, the radial sealing lip 5d extending towards the radial upright wall 2b of the sealing plate 2 is provided with a ring shaped spring member 9 for radially inwardly biasing the radial sealing lip 5d. For the ring shaped spring member 9, a garter spring or the like is employed. Other structural features are similar to those in the fourth embodiment shown in and described with particular reference to FIG. 9. In the wheel support bearing assembly 70 shown in and described with particular reference to FIG. 10, the bearing sealing device 1A at the inboard end may be replaced with that shown in and described with particular reference to FIG. 11 in connection with the fifth embodiment of the present invention.

As hereinabove described, with the structure in which the radial sealing lip 5d is provided with the ring shaped spring member 9 for radially inwardly biasing the radial sealing lip 5d, the contact of the radial sealing lip 5d with the cylindrical wall 2a of the sealing plate 2 can be enhanced. At the same time, the lip follow-up characteristic of the radial sealing lip 5d to offset during assemblage of the bearing assembly onto the automotive vehicle can be increased. Therefore, the effect of preventing the ingress of muddy water by the radial sealing lip 5d can be increased further.

Figure 12:
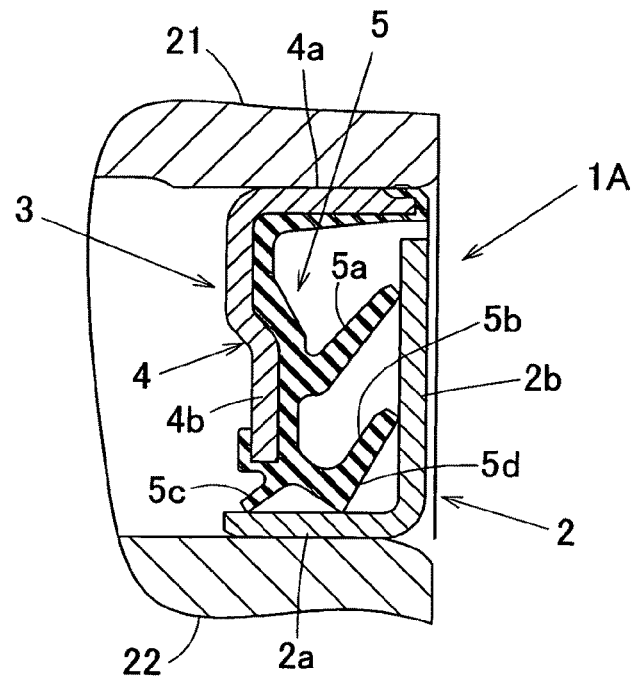
FIG. 12 is a longitudinal sectional view of the bearing sealing device according to a sixth preferred embodiment of the present invention.

FIG. 12 illustrates a sixth preferred embodiment of the bearing sealing device 1A. In this sixth embodiment, of the two side sealing lips 5a and 5b employed in the fourth embodiment shown in and described with particular reference to FIG. 9, the side sealing lip 5b on an inner diametric side is made to extend from the tip of one of the two radial sealing lips 5c and 5d, which extends towards the radial upright wall 2b of the sealing plate 2, that is, the radial sealing lip 5d to thereby form a sealing lip of one piece construction. Other structural features are similar to those shown in and described with particular reference to FIG. 9 in connection with the fourth embodiment of the present invention.

As hereinabove described, where the side sealing lip 5b on the inner diametric side is so formed as to extend from the tip of the radial sealing lip 5d to thereby form the sealing lip of one piece construction, the sealing lip structure employed in the bearing sealing device 1A can be simplified and, therefore, it becomes easy to suppress the sealing device sectional height H to a value equal to or smaller than 15 mm.

Figure 13:
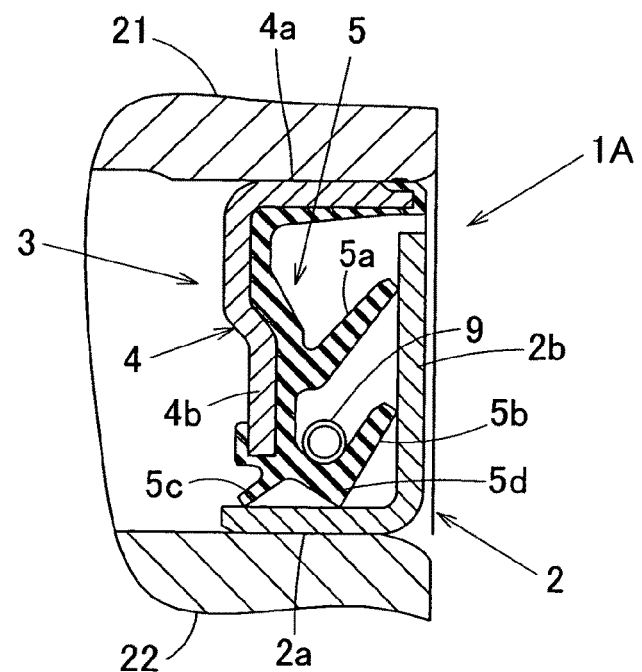
FIG. 13 is a longitudinal sectional view of the bearing sealing device according to a seventh preferred embodiment of the present invention.

FIG. 13 illustrates a seventh preferred embodiment of the bearing sealing device 1A. In this seventh embodiment, the sealing lip of one piece construction, in which the side sealing lip 5b and the radial sealing lip 5d are integrated together in the sixth embodiment shown in and described with particular reference to FIG. 12, is provided with a ring shaped spring member 9 for radially inwardly biasing the radial sealing lip 5d. Other structural features are similar to those shown in and described with particular reference to FIG. 12 in connection with the sixth embodiment of the present invention.

As hereinabove described, where the side sealing lip 5b on the inner diametric side is so formed as to extend from the tip of the radial sealing lip 5d to thereby form the sealing lip of one piece construction and, at the same time, the ring shaped spring member 9 is provided on the sealing lip of one piece construction for radially inwardly biasing the radial sealing lip 5d, the sealing lip structure of the bearing sealing device 1A can be simplified and along therewith, it becomes easy to suppress the sealing device sectional height H to a value equal to or smaller than 15 mm. In addition, the contact of the side sealing lip 5b and the radial sealing lip 5d with the radial upright wall 2b and the cylindrical wall 2a of the sealing plate 2 can be enhanced and further, the lip follow-up characteristic of the radial sealing lip 5d due to offset during assemblage of the bearing assembly onto the automotive vehicle can be increased and therefore, the effect of preventing the ingress of muddy water by the radial sealing lip 5d can be increased further.

The bearing sealing device 1A according to the fourth embodiment shown in and described with reference to FIG. 9 can be equally applied to the first constructional example, which is directed to the wheel support bearing assembly shown in and described with reference to FIG. 2, and the second constructional example, which is directed to the wheel support bearing assembly shown in and described with reference to FIG. 5.

Figure 14:
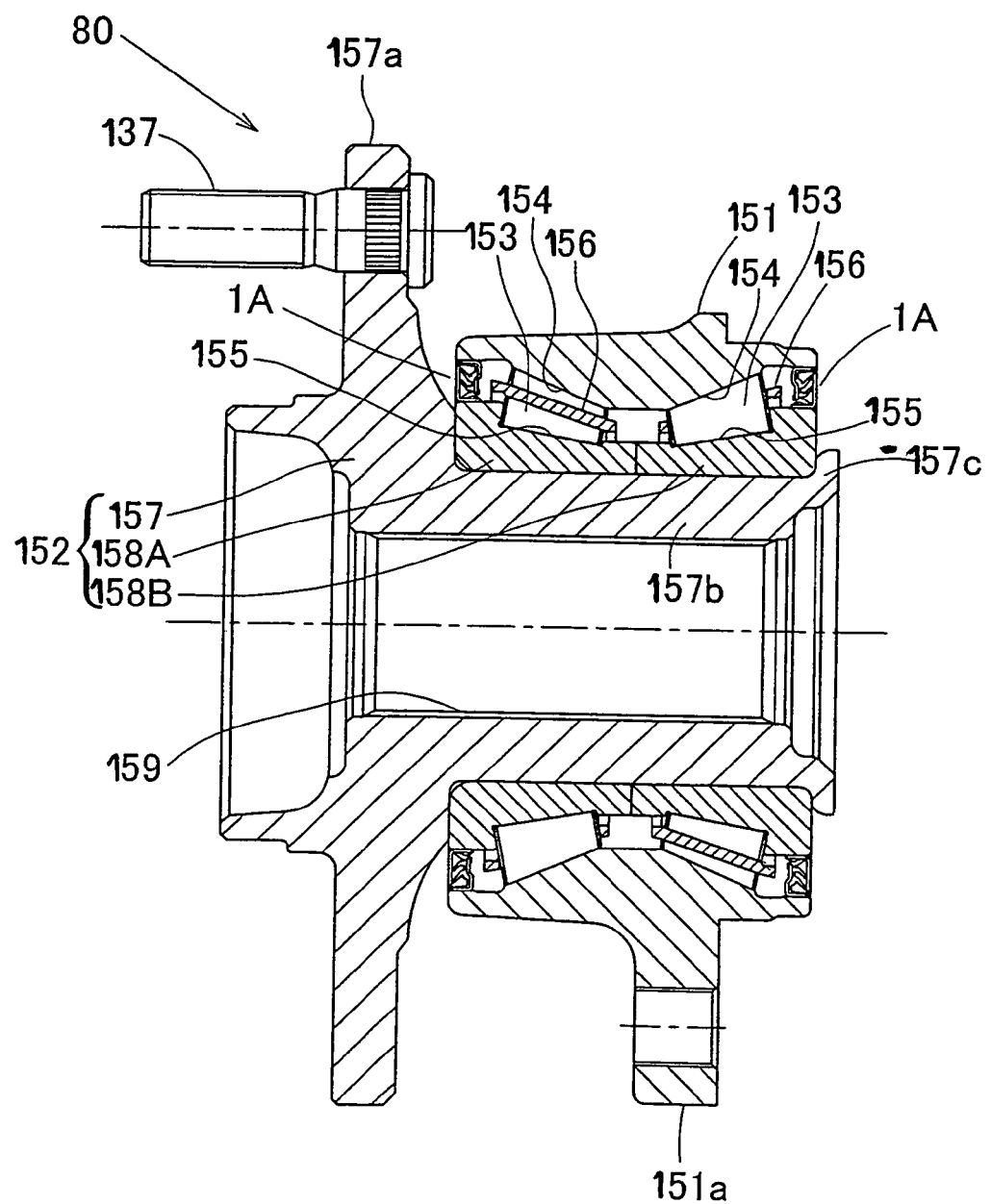
FIG. 14 is a longitudinal sectional view of an eighth constructional example of the wheel support bearing assembly provided with the bearing sealing device shown in FIG. 9.
Figure 15:
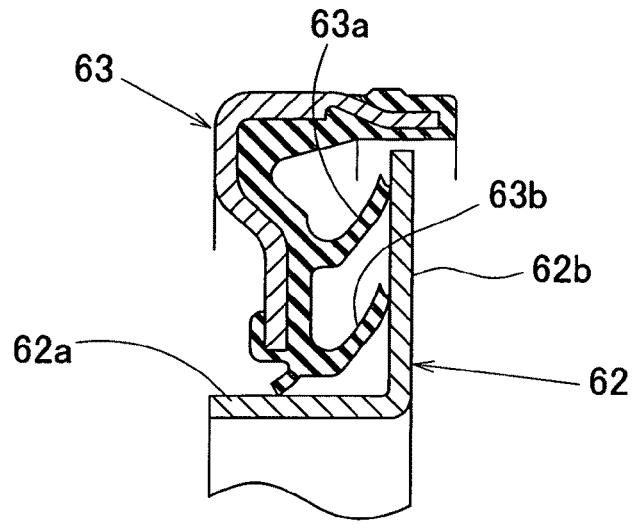
FIG. 15 is a longitudinal sectional view of the conventional bearing sealing device.
Figure 16:
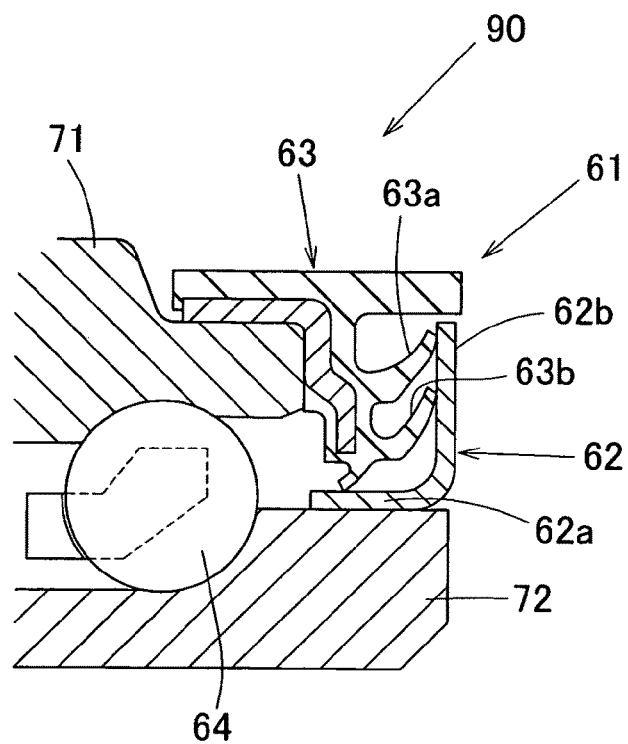
FIG. 16 is a longitudinal sectional view of the wheel support bearing assembly provided with the conventional bearing sealing device.
Figure 17:
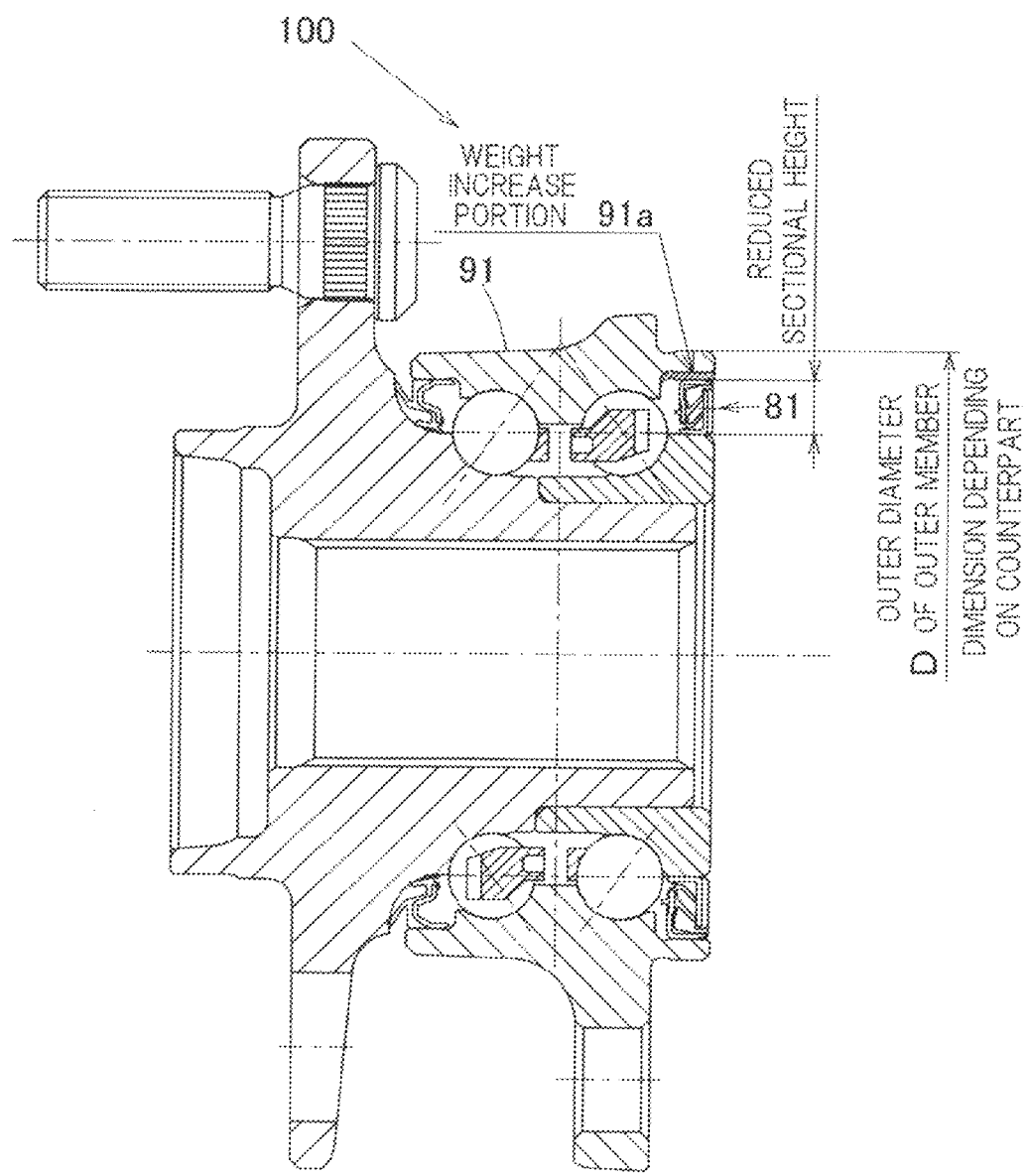
FIG. 17 is a longitudinal sectional view of another example of the wheel support bearing assembly provided with the conventional bearing sealing device.

FIG. 14 illustrates an eighth constructional example of the wheel support bearing assembly. This wheel support bearing assembly, now identified by 80, is of a double row tapered roller bearing design classified as a second generation type and is an inner ring rotating type and is used for rotatably supporting a vehicle drive wheel. This wheel support bearing assembly 80 includes an outer member 151 having an inner periphery formed with double row rolling surfaces 154, an inner member 152 having rolling surfaces 155 formed in face-to-face relation with the rolling surfaces 154, and double row rolling elements 153 interposed between those double row rolling surfaces 154 and 155. The rolling elements 153 are employed in the form of tapered rollers and are retained by a retainer 156 employed for each of the rows. The outer member 151 serves as a stationary member and is of one piece construction having a flange 151a formed on the outer periphery thereof, which flange 151a is adapted to be fitted to a knuckle (not shown) forming a part of the automobile suspension system. The inner member 152 serves as a rotatable member and includes a hub axle 157 and a pair of split type inner rings 158A and 158B, which are mounted on an outer periphery of the hub axle 157, and the rolling surfaces 155 of each row referred to above are formed in those inner rings 158A and 158B, respectively. The hub axle 157 has a wheel mounting hub flange 157a on the outer periphery thereof. This hub flange 157a carries a vehicle wheel (not shown) fitted thereto through a brake rotor (also not shown) by means of hub bolts 137. An inboard end of a shank portion 157b of the hub axle 157 is rendered to be a crimped portion 157c, which is urged against an inboard end face of the inner ring 158B. The hub axle 157 has a center bore 159 defined therein, and an outer coupling member of a constant velocity universal joint (not shown) is splined to the center bore 159. Opposite ends of an annular space delimited between the inner and outer members 152 and 151 are sealed by respective bearing sealing devices 1A shown in and described with reference to FIG. 9 in connection with the fourth embodiment of the present invention.

It is to be noted that the bearing sealing device 1A according to the fourth embodiment and shown in FIG. 9 can be equally applied as a sealing device to the third constructional example, which is directed to the wheel support bearing assembly shown in FIG. 6, and the fourth constructional example, which is directed to the wheel support bearing assembly shown in FIG. 7.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A bearing sealing device for sealing between outer and inner members of a wheel support bearing assembly, which are rotatable relative to each other through rolling elements, which device comprises:
    an annular sealing plate fitted to the inner member;
    an annular elastic sealing member fitted to the outer member;
    the annular sealing plate and the annular elastic sealing member confronting with each other;
    the sealing plate being made of a metallic material and having an L-shaped section including a first cylindrical wall, mounted on an outer periphery of the inner member, and a first radial upright wall protruding radially outwardly from one end of the first cylindrical wall;
    the elastic sealing member including an annular core metal and an elastic body secured to the core metal;
    the core metal being opposed to the sealing plate and being of an L-shaped section including a second cylindrical wall, which is mounted on an inner peripheral surface of the outer member, and a second radial upright wall extending radially inwardly from one end of the second cylindrical wall;
    the elastic body including two side sealing lips juxtaposed radially inwardly and outwardly on the core metal, and having respective tips held in contact with the first radial upright wall of the sealing plate;
    a sealing device sectional height H, which is a radial length as measured from an inner diametric surface of the sealing plate to an outer diametric surface of the elastic sealing member, being within a range of 6 to 8 mm and a distance between the two side sealing lips being within a range of 0.1 to 2.0 mm; and
    a ratio H/B of the sealing device sectional height H relative to a sealing device width B, which is an axial dimension of a combination of the sealing plate and the elastic sealing member, is within a range of 1.2 to 1.8.

2. The bearing sealing device as claimed in claim 1, wherein the elastic body is provided with a radial sealing lip extending in a direction towards the first cylindrical wall of the sealing plate and operable to prevent a leakage of grease.

3. The bearing sealing device as claimed in claim 2, wherein the radial sealing lip is held in proximity to an outer peripheral surface of the first cylindrical wall of the sealing plate to thereby form a labyrinth seal.

4. The bearing sealing device as claimed in claim 1, wherein the elastic body has an inner peripheral surface representing a flat sectional shape.

5. A wheel support bearing assembly comprising outer and inner members rotatable relative to each other through a plurality of rows of rolling elements and operable to support a vehicle wheel rotatably relative to a vehicle body structure, in which a bearing sealing device as defined in claim 1 is provided on one or both of inboard and outboard ends of a bearing space delimited between the outer and inner members, in which the outer member is a rotatable member and the bearing sealing device as defined in claim 1 is provided on the inboard end of the bearing space.

6. A wheel support bearing assembly comprising outer and inner members rotatable relative to each other through a plurality of rows of rolling elements and operable to support a vehicle wheel rotatably relative to a vehicle body structure, in which a bearing sealing device as defined in claim 1 is provided on one or both of inboard and outboard ends of a bearing space delimited between the outer and inner members.

7. The wheel support bearing assembly as claimed in claim 6, in which the inner member includes a hub axle, having a wheel mounting hub flange and a shank portion, and an inner ring mounted on an outer periphery of an inboard end of the shank portion of the hub axle, and in which the hub axle and the inner ring have respective rows of rolling surfaces formed therein for the rolling elements to roll therealong.

8. The wheel support bearing assembly as claimed in claim 6, in which the inner member includes a hub axle, having a wheel mounting hub flange and a shank portion, and an outer coupling member forming a part of a constant velocity universal joint and, in which a stem portion of the outer coupling member is coupled with the hub axle and the hub axle and the outer coupling member have respective rows of rolling surfaces formed therein for the rolling elements to roll therealong.

9. The wheel support bearing assembly as claimed in claim 6, which is a double row tapered roller bearing design.

10. The wheel support bearing assembly as claimed in claim 6, which is a double row contact ball bearing design.

11. A bearing sealing device for sealing between outer and inner members of a wheel support bearing assembly, which are rotatable relative to each other through rolling elements, the device comprising:
    an annular sealing plate fitted to the inner member;
    an annular elastic sealing member fined to the outer member;
    the annular sealing plate and the annular elastic sealing member confronting with each other;
    the sealing plate being made of a metallic material and having an L-shaped section including a first cylindrical wall, mounted on an outer periphery of the inner member, and a first radial upright wall protruding radially outwardly from one end of the first cylindrical wall;
    the elastic sealing member including an annular core metal and an elastic body secured to the core metal;
    the core metal being opposed to the sealing plate and being of an L-shaped section including a second cylindrical wall, which is mounted on an inner peripheral surface of the outer member, and a second radial upright wall extending radially inwardly from one end of the second cylindrical wall; and the elastic body including two side sealing lips juxtaposed radially inwardly and outwardly on the core metal, and having respective tips held in contact with the first radial upright wall of the sealing plate, the distance between those side sealing lips being equal to or greater than 0.1 mm, wherein the elastic body includes, in addition to the two side sealing lips, two radial sealing lips juxtaposed axially and having their tips held in contact with or in proximity to an outer peripheral surface of the sealing plate and in which a sealing device sectional height H, which is a radial length as measured from an inner diametric surface of the sealing plate to an outer diametric surface of the elastic sealing member, is within the range of 9 to 15 mm.

12. The bearing sealing device as claimed in claim 11, wherein one of the two radial sealing lips is provided with a ring shaped spring member for radially inwardly biasing such radial sealing lip.

13. The bearing sealing device as claimed in claim 11, wherein the side sealing lip on an inner diametric side is made to extend from a tip of one of the two radial sealing lips to form a sealing lip of one piece structure.

14. The bearing sealing device as claimed in claim 13, wherein the sealing lip, in which the side sealing lip and the radial sealing lip are integrated together, is provided with a ring shaped spring member for radially inwardly biasing such radial sealing lip.

* * * * *